United States Patent Office 2,835,713
Patented May 20, 1958

2,835,713

PREPARATION OF UNSATURATED CYCLIC POLYENE COMPOUNDS BY DECARBOXYLATION USING AN ORGANIC ACID OR ACID ANHYDRIDE AS DEHYDRATING AGENT

Charles Donald Robeson, Rochester, N. Y., assignor to Eastman Kodak Company, Rochester, N. Y., a corporation of New Jersey No Drawing. Application July 1, 1954
Serial No. 440,838

10 Claims. (Cl. 260—666)

This invention relates to the preparation of conjugated polyenes, and is particularly concerned with the preparation of vitamin A active compounds and their intermediates. More specifically, the invention is concerned with the preparation of such compounds by forming double bonds in certain carboxylic acid compounds having a conjugated structure.

A preferred method for forming double bonds in organic compounds has been to dehydrate carbinols with such dehydrating agents as mineral acids, organic acids, acid salts and similar acidic dehydrating agents. However, when conjugated carbinols are dehydrated with the above acid dehydrating agents, isomeric mixtures are formed which are difficult to separate. Such isomeric mixtures are unavoidable as the acids that are used to effect the dehydration also catalyze the isomerization of the dehydrated product. As the resulting isomers often have similar chemical and physical properties, they are difficult to separate.

The formation of isomeric mixtures is undesirable in synthetic processes as additional purification steps are thereby required. Further, low yields of the desired isomer may make the process economically unfeasible. It is therefore highly desirable to have a means by which a double bond can be specifically inserted in an unsaturated organic compound having a conjugated structure without any substantial isomerization accompanying such insertion.

It is accordingly an object of this invention to provide a new and improved method for preparing conjugated polyenes without isomerization.

It is another object of this invention to treat an unsaturated beta-hydroxy carboxylic acid having a conjugated structure so as to introduce a double bond between the carbon atoms alpha and beta to the original carboxyl group without objectionable isomerization.

It is another object of this invention to dehydrate and decarboxylate a conjugated beta-hydroxy carboxylic acid by a simple and economical process without objectionable isomerization.

It is another object of this invention to prepare conjugated hydrocarbons by a practical and commercially feasible method.

It is a further object of this invention to prepare by a novel process a biologically active hydrocarbon with the formula of

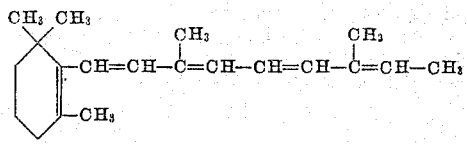

Compound 1

It is a further object of this invention to provide vitamin A active compounds exhibiting color suitable for use in coloring food products as well as providing vitamin A fortifications.

These and other objects are accomplished by treating a conjugated beta-hydroxy carboxylic acid with an acid anhydride, under substantially anhydrous conditions, so as to decarboxylate and dehydrate the beta-hydroxy acid and introduce a double bond between the carbon atoms alpha and beta to the original carboxylic group to form a hydrocarbon having conjugated unsaturation.

The invention is applicable to beta-hydroxy carboxylic acids having the general formula

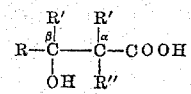

Compound 2 where R is a conjugated polyene radical, R' is a hydrogen atom or a lower alkyl radical and R" is a lower alkyl radical, a conjugated polyene radical or a hydrogen atom. R and R" are preferably conjugated polyenes in which the conjugation is arranged so as to be in conjugation with the double bond to be inserted between the alpha and beta carbon atoms of Compound 2. Other conjugated polyenes can be employed however. A preferred substituent of the radical R of Compound 2 is a conjugated radical terminating in a beta-ionone ring.

In Compound 2, if the carbinol radical were attached to a carbon atom other than the beta-carbon atom, or if the carboxyl radical were esterified, substantially no decarboxylation would result when acid anhydrides or other acidic dehydrating agents are employed. Accordingly the herein described process is specific for a simultaneous dehydration and decarboxylation of beta-hydroxy carboxylic acids.

A typical beta-hydroxy carboxylic acid that can be dehydrated and decarboxylated to form a conjugated hydrocarbon is 1-(2,6,6-trimethyl-1-cyclohexen-1-yl)-3,7-dimethyl-7-hydroxy-8-carboxyl-1,3,5-nonatriene having the formula

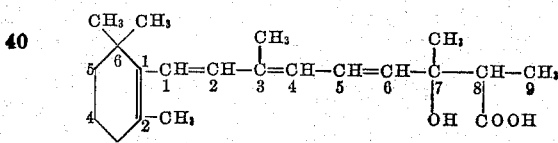

Compound 3

Other beta-hydroxy carboxylic acids that can be employed with similar results include: 1-(2,6,6-trimethyl-1-cyclohexen - 1 - yl) - 3,7 - dimethyl - 7 - hydroxy - 8 - carboxy - 1,3,5-octatriene; 1-(2-6,6-trimethyl-1-cyclohexen-1-yl)-3-methyl-3-hydroxy-4-carboxy-1-pentene; 1-(2,6,6-trimethyl - 1 - cyclohexen - 1 - yl) - 3 - methyl - 3 - hydroxy - 4-carboxy-1-butene; 1-(2,6,6-trimethyl-1-cyclohexen-1-yl) - 3,7,10 - trimethyl - 9 - hydroxy - 10 - carboxy-1,3,5,7-decatetraene; 1-(2,6,6-trimethyl-1-cyclohexen-1-yl)-3,7-dimethyl - 9 - hydroxy - 10 - carboxy - 1,3,5,7,11 - dodecapentaene; 1-(2,6,6-trimethyl-1-cyclohexen-1-yl)3,7,11-trimethyl - 9 - hydroxy - 10 - carboxy-1,3,5,7,11-dodecapentaene; 1-(2,6,6-trimethyl-1-cyclohexen-1-yl)-3,7-dimethyl-9-butyl-9-hydroxy-10-carboxy-1,3,5,7-decatetraene; 1-(2,6,6 - trimethyl - 1 - cyclohexen - 1 - yl) - 3,7,10 - trimethyl - 9 - hydroxy - 10 - carboxy - 1,3,5,7 - dodecatetra - ene; 1 - (2,6,6 - trimethyl - 1 - cyclohexen - 1 - yl) - 3,7,10-trimethyl - 9 - hydroxy - 10 - carboxy - 1,3,5,7 - tridecatetraene; 6-hydroxy-7-carboxy-2,4-heptadiene; and similar beta-hydroxy carboxylic acids. Beta-hydroxy carboxylic acids, as employed in this process can be prepared by well-known methods. Such beta-hydroxy carboxylic acids, however, are preferably prepared with the well-known Reformatzky reaction by reacting alpha-halogen esters with a compound containing a carbonyl group and thereafter saponifying the ester, acidifying and separating the beta-hydroxy acid. Typical of such beta-hydroxy acids is a beta-hydroxy acid prepared by condensing vitamin A aldehyde with alpha-bromo-propionate in the presence of zinc and thereby forming a beta-hydroxy ester which can be readily converted into the beta-hydroxy acid, 1-(2,6,6-trimethyl-1-cyclohexen-1-yl)-3,7,10-trimethyl-9-hydroxy-10-carboxy-1,3,5,7 decatetraene.

Any of the well-known organic acid anhydrides can be suitably employed, such as acetic anhydride, n-butyric anhydride, n-propionic anhydride, n-caproic anhydride, phthalic anhydride, succinic anhydride and similar acid anhydrides. Other well-known dehydrating agents such as mineral acids, organic acids, acid salts and similar acidic dehydrating agents do not simultaneously dehydrate and decarboxylate beta-hydroxy carboxylic acids and thus can not be employed in lieu of the acid anhydrides in the herein described process.

The acid anhydride dehydration and decarboxylation process is conducted under substantially anhydrous conditions, preferably in an organic solvent substantially inert to the acid anhydride such as benzene, petroleum ether, ethyl ether and related solvents, although the present reaction can be effected without the use of such solvents. The reaction can be effected at room temperature although the application of heat to the reaction mixture can be used to increase the rate of reaction.

The dehydration and decarboxylation results in the placement of a double bond between the carbon atoms which were alpha and beta to the original carboxyl radical. Accordingly, the product is not in admixture with isomers because of this specificity of double bond placement. Further, decarboxylation of the beta-hydroxy acid is likewise specific as well as being substantially complete. Thus, the preparation of specific unsaturated compounds can be more easily effected in high yields by this invention.

The invention is employed in the dehydration of conjugated carbinols such as carbinols of vitamin A intermediates and similar conjuted compounds. The usual method for dehydrating carbinols to the corresponding unsaturated compound is to use acidic catalysts such as hydrochloric acid, p-toluene sulfonic acid, phosphorous pentoxide, thionyl chloride and other acidic compounds. However, these acidic dehydrating agents, as disclosed hereinabove, produce isomeric mixtures from which it is difficult to separate the desired isomers. For example, in the acid catalyzed dehydration of a typical conjugated carbinol such as a vitamin A intermediate having the formula

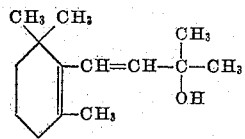

Compound 4 an isomeric mixture results which contains a compound having the formula

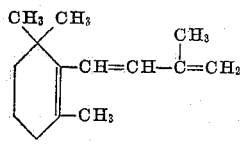

Compound 5 together with the corresponding retro-isomer having the formula

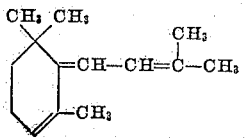

Compound 6

Thus, the above-described prior art dehydration process for the insertion of a double bond in such a conjugated system is undesirable because of the resulting isomerism. However, Compound 5 can be easily prepared substantially free of the corresponding retro-isomer, Compound 6, by dehydrating a beta-hydroxy carboxylic acid having the formula

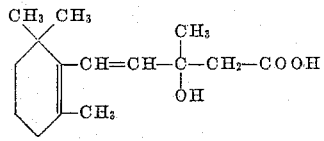

Compound 7 with an acid anhydride under substantially anhydrous conditions. Accordingly, in the dehydration of such a beta-hydroxy carboxylic acid as Compound 7 with an acid anhydride, a double bond is specifically inserted between the atoms alpha and beta to the original carboxyl radical with substantially no reversion to the retro-isomer, Compound 6.

The present acid anhydride dehydration process not only dehydrates beta-hydroxy caboxylic acids and specifically inserts double bonds therein, with substantially no isomerization, but it also decarboxylates beta-hydroxy carboxylic acids to form hydrocarbons. Thus, the process provides a simple and efficient means for preparing hydrocarbons.

The herein disclosed acid anhydride dehydration and decarboxylation process is particularly useful in preparing such hydrocarbons as vitamin A hydrocarbon. Vitamin A hydrocarbon, Compound 1, is of interest as it has about one-fourth the biological activity of vitamin A alcohol. The dehydration of the corresponding beta-hydroxy carboxylic acid, Compound 3, with an acid anhydride to form vitamin A hydrocarbon can be effected without the formation of isomers having less biological activity such as the retro-isomer of vitamin A hydrocarbon. The retro-isomer of vitamin A hydrocarbon has very low biological activity and accordingly decreases the biological utility of vitamin A hydrocarbon if admixed therewith. Many methods of dehydrating carbinols result in the formation of such undesirable isomers as the retro-isomer and are thus unsatisfactory. However, vitamin A hydrocarbon can be most easily prepared, with substantially no isomerization, by the herein disclosed acid anhydride dehydration and decarboxylation method.

The preparation of useful hydrocarbons of the formula

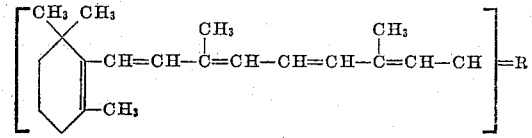

Compound 8 wherein R is a chromatic-lending conjugated polyene radical in conjugation with the vitamin A moiety, the vitamn A moiety being the bracketed portion of Compound 8, can also be readily effected by dehydrating and decarboxylating the corresponding beta-hydroxy acid. Such beta-hydroxy acids can be prepared by condensing vitamin A aldehyde with alpha-halogen esters in accordance with the Reformatzky reaction. Typical of the substituents for radical R of Compound 8 are

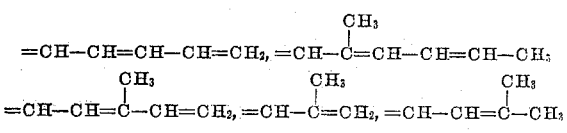

and related conjugated polyenes. By adding to the conjugation of the vitamn A moiety, compounds more highly colored than vitamin A can be prepared, with vitamin A active compounds exhibiting such colors as yellow-orange and orange being readily prepared. The resulting hydrocarbons thus have the biologically active vitamin A moiety in addition to the chromatic-lending conjugated polyene radical. Accordingly, these biologically active and highly colored compounds are particularly suited for fortifying and coloring numerous food products and margarine in particular.

*Example 1*

To a 1.2 g. sample of 1-(2,6,6-trimethyl-1-cyclohexen-1-yl)-3,7-dimethyl-7-hydroxy-8-carboxy-1,3,5 - octatriene dissolved in 3 cc. of benzene was added 1.2 g. of phthalic anhydride. After the mixture was allowed to stand at about 25° C. for 24 hours, the mixture was admixed with 100 cc. of N/2 aqueous potassium hydroxide and thereafter extracted with ethyl ether. The ether extract was washed again with N/2 potassium hydroxide and thereafter further washed with water. The remaining fraction was dried and chromatographed on a column of sodium aluminum silicate. The non-adsorbed fraction, containing the product, was further purified by crystallization from petroleum ether and yielded yellow crystals of desmethyl vitamin A hydrocarbon, 1-(2,6,6-trimethyl-1-cyclohexen-1-yl)3,7-dimethyl-1,3,5,7 - octatetraene, melting at 61–62° C. and $$E_{1\,cm.}^{1\%}(319\ m\mu) = 1815$$

Infrared adsorption curves showed an absence of bonds characteristic of hydroxyl or carboxyl groups, while showing curves characteristic of a terminal methylene group.

*Example 2*

Desmethyl vitamin A hydrocarbon was prepared as in Example 1 except that acetic anhydride was used instead of phthalic anhydride as the dehydrating and decarboxylating agent.

*Example 3*

Desmethyl vitamin A hydrocarbon was prepared as in Example 1 except that succinic anhydride was used instead of phthalic anhydride as the dehydrating and decarboxylating agent.

*Example 4*

Desmethyl vitamin A hydrocarbon was prepared as in Example 1 except that caproic anhydride was used instead of phthalic anhydride as the dehydrating and decarboxylating agent.

*Example 5*

To a 6.8 g. sample of 1-(2,6,6-trimethyl-1-cyclohexen-1-yl)-3,7-dimethyl-7-hydroxy-8-carboxy-1,3,5 - nonatriene dissolved in 10 cc. of benzene was added 6 cc. of acetic anhydride. The reaction and subsequent purification were carried out as in Example 1. The crude product from the reaction weighed 4.65 g. for a corresponding yield of about 84%. Yellow crystals of vitamin A hydrocarbon, 1 - (2,6,6-trimethyl-1-cyclohexen-1-yl)-3,7-dimethyl-1,3,5,7-nonatetraene, resulted, having a M. P. 71–72° C. and $$E_{1\,cm.}^{1\%}(323\ m\mu) = 1800$$

Infrared analysis showed no remaining hydroxyl or carboxyl groups.

*Example 6*

To a 5 g. sample of the beta-hydroxy acid 1-(2,6,6-trimethyl-1-cyclohenen-1-yl)-3-methyl - 3 - hydroxy-4-carboxy-1-butene, $$E_{1\,cm.}^{1\%}(234\ m\mu) = 185$$

was added 5 cc. of acetic anhydride. The reaction and subsequent purification were carried out as in Example 1. The resulting product, 1-(2,6,6-trimethyl-1-cyclohexen-1-yl)-3-methyl-1,3-butadiene, was a nearly colorless, limpid oil weighing 1.8 g. and having $$E_{1\,cm.}^{1\%}(228,\ 262\ m\mu) = 633,\ 611$$

The infrared adsorption curves of the product showed bands charcteristic of a terminal methylene group and an absence of bands characteristic of hydroxyl or carboxyl groups.

*Example 7*

To a 5.0 g. sample of the beta-hydroxy acid, 1-(2,6,6-trimethyl-1-cyclohexen-1-yl)-3-methyl - 3 - hydroxy-4-carboxy-1-pentaene, having $$E_{1\,cm.}^{1\%}(234\ m\mu) = 166$$

dissolved in 7 cc. of benzene was added 7 cc. of acetic anhydride. The solution was worked up as described in Example 1. The purified hydrocarbon product, 1-(2,6,6-trimethyl-1-cyclohexen-1-yl)-3-methyl - 1,3 - pentadiene, was a nearly colorless oil weighing 2.2 g. and having $$E_{1\,cm.}^{1\%}(257\ m\mu) = 679$$

An infrared analysis of the product showed an absence of hydroxyl and carboxyl groups.

*Example 8*

To a 6 g. sample of the beta-hydroxy acid, 1-(2,6,6-trimethyl-1-cyclohexen-1-yl)-3,7,10 - trimethyl - 9 - hydroxy-10-carboxy-1,3,5,7-decabutene, dissolved in 10 cc. of benzene, was added 6 cc. of acetic anhydride. The reaction and subsequent purification were carried out in accordance with the procedure described in Example 1. The purified hydrocarbon, 1-(2,6,6-trimethyl-1-cyclohexen-1-yl)-3,7,10-trimethyl - 1,3,5,7,9 - decapentene, was an orange-yellow vitamin A active material having $$E_{1\,cm.}^{1\%}(356\ m\mu) = 2040$$

Infrared analysis showed an absence of hydroxyl and carboxyl groups.

Thus, by means of this invention a double bond can be specifically introduced into a conjugated organic compound with the simultaneous removal of a hydroxyl and a carboxyl group to form a hydrocarbon. The disadvantages attendant to other methods of dehydration are not present, as there is substantially no isomerization of the product.

While the invention has been described in considerable detail with reference to certain preferred embodiments thereof, it will be understood that variations and modifications can be effected within the spirit and scope of the invention as described hereinabove and as defined in the appended claims.

I claim:

1. The method which comprises treating a beta-hydroxy carboxylic acid of the formula

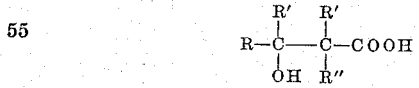

wherein R is a conjugated polyene radical terminating in a beta ionone ring, R' is a member of the group consisting of hydrogen atoms and lower alkyl radicals and R'' is a member of the group consisting of lower alkyl radicals, conjugated polyene radicals and hydrogen atoms, with an organic acid anhydride under substantially anhydrous conditions and thereby forming a compound having a conjugated unsaturation of the formula

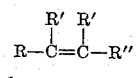

substantially free of the corresponding retro-isomer.

2. The method of treating an unsaturated beta-hydroxy carboxylic acid having the formula

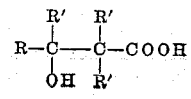

wherein R is a conjugated polyene radical terminating in a beta-ionone ring and R' is a member of the group consisting of hydrogen atoms and lower alkyl radicals, with an organic acid anhydride under substantially anhydrous conditions and thereby forming a hydrocarbon having a conjugated unsaturation of the formula

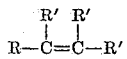

substantially free of the corresponding retro-isomer.

3. The method which comprises treating a beta-hydroxy carboxylic acid of the formula

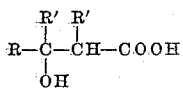

wherein R is a conjugated polyene radical terminating in a beta-ionone ring and R' is selected from the group consisting of methyl radicals and hydrogen atoms, with an organic acid anhydride under substantially anhydrous conditions and thereby forming a hydrocarbon having conjugated unsaturation of the formula

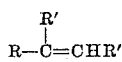

substantially free of the corresponding retro-isomer.

4. The method which comprises treating a compound of the formula

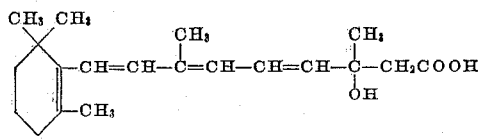

with an organic acid anhydride under substantially anhydrous conditions and thereby forming a compound of the formula

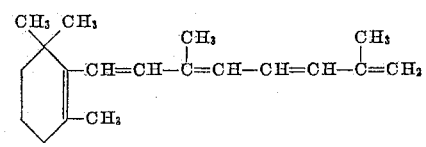

substantially free of the corresponding retro-isomer.

5. The method which comprises treating a compound of the formula

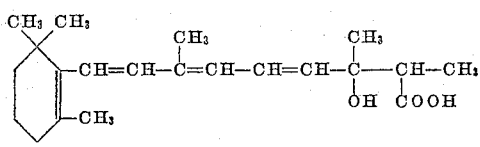

with an organic acid anhydride under substantially anhydrous conditions and thereby forming a compound of the formula

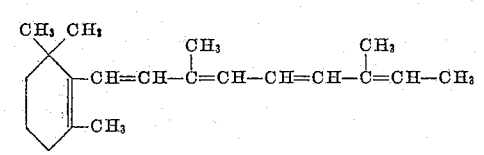

substantially free of the corresponding retro-isomer.

6. The method of treating a beta-hydroxy carboxylic acid of the formula

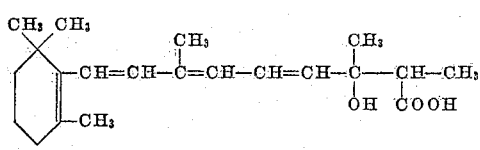

with acetic anhydride and thereby decarboxylating and dehydrating said acid and forming a hydrocarbon of the formula

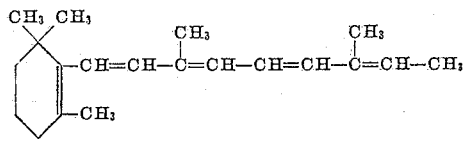

substantially free of the corresponding retro-isomer.

7. The method which comprises treating a compound of the formula

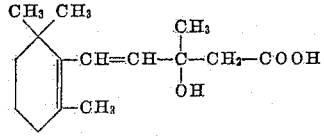

with an organic acid anhydride under substantially anhydrous conditions and thereby forming a compound of the formula

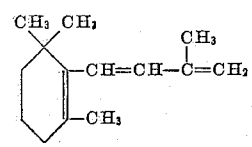

substantially free of the corresponding retro-isomer.

8. The method which comprises treating a compound of the formula

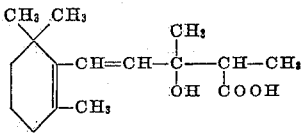

with an organic acid anhydride under substantially anhydrous conditions and thereby forming a compound of the formula

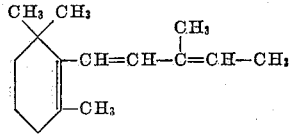

substantially free of the corresponding retro-isomer.

9. The method of making a colored vitamin A active material suitable for fortifying and coloring food products, which comprises treating a compound of the formula

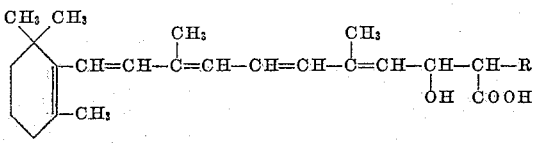

where R is a chromatic-lending conjugated polyene radical, with an organic acid anhydride under substantially anhydrous conditions and thereby forming a compound of the formula

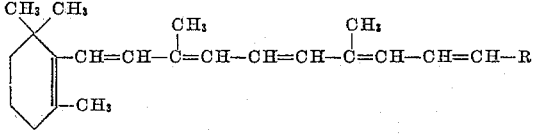

substantially free of the corresponding retro-isomer.

10. The method of simultaneously decarboxylating and dehydrating a beta-hydroxy carboxylic acid which comprises treating a compound of the formula

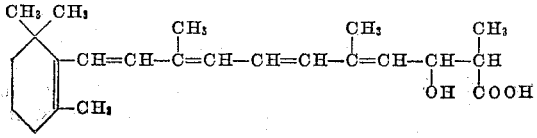

with acetic anhydride under substantially anhydrous contions and thereby forming a compound of the formula

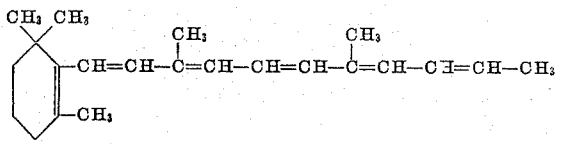

substantially free of the corresponding retro-isomer.

References Cited in the file of this patent

"Organic Reactions," Adams et al., vol 1, pages 11 to 13, John Wiley and Son, New York (1942).

Wendler et al.: Jour. Am. Chem. Soc., vol 73, February 1951, pp. 719–724 (p. 721 and 722 only relied on).

Synthesis and Properties of Vitamin A etc. Baxter, pages 78 and 79, Springer Verlag Wren (1952).

Allylic Rearrangements and Dehydration in Substituted B-Ionais, by Oroshnik et al., J. A. C. S., vol. 74, Aug. 5, 1952, pages 3807–3813.